United States Patent [19]

Carter et al.

[11] Patent Number: 4,862,467
[45] Date of Patent: Aug. 29, 1989

[54] ONE- AND TWO-DIMENSIONAL OPTICAL WAVEFRONT SYNTHESIS IN REAL TIME

[75] Inventors: Michael J. Carter, Newmarket, N.H.; David Welford, Middleton, Mass.

[73] Assignee: Massachusetts Institute of Technology, Cambridge, Mass.

[21] Appl. No.: 169,852

[22] Filed: Mar. 18, 1988

[51] Int. Cl.[4] .............................................. H01S 3/098
[52] U.S. Cl. ...................................... 372/18; 372/33; 372/29
[58] Field of Search ..................... 372/703, 102, 33, 29

[56] References Cited

U.S. PATENT DOCUMENTS 3,691,483 9/1972 Klein ........................................ 372/18
4,649,351 3/1987 Velpkamp et al. .................... 372/18

Primary Examiner—Léon Scott, Jr.

[57] ABSTRACT

Light from a master laser is divided into multiple beams. Each of the beams is imaged onto a slave laser in a slave laser array. The multiple beams injection lock the frequency of each laser in the slave laser array to the frequency of the master laser. Some of the output light from the array of slave lasers is directed onto an optical wavefront measurement sensor which measures spatial variation in light phase and intensity. A computer responsive to the output of the optical wavefront measurement sensor controls the injection current to each laser in the slave laser array to adjust dynamically the relative phase of each laser in the array so as to synthesize a desired wavefront.

7 Claims, 1 Drawing Sheet

ONE- AND TWO-DIMENSIONAL OPTICAL WAVEFRONT SYNTHESIS IN REAL TIME

The Government has rights in this invention pursuant to Contract Number F19628-85-C-0002 awarded by the Department of the Air Force.

BACKGROUND OF THE INVENTION

This invention relates to real time optical wavefront synthesis.

Optical wavefront synthesis in real time is highly desirable and has many applications. One application is for commercial laser ranging systems for general non-contact metrology, for example, for surface deformation measurement, precision machining systems and topographic mapping systems. Another application is in laser scanning devices such as supermarket bar code readers, flying spot scanners for printed circuit board inspection and machine vision systems. Laser printing devices and smart optical alignment systems are other applications of wavefront synthesis. Heretofore, the above applications utilized electro-mechanical equipment for steering the laser beam. Such electro-mechanical steering systems have inherent limitations on the speed of steering and adjustment of the optical wavefront.

U.S. Pat. No. 3,691,483 to Klein teaches a phased array laser source capable of scanning a laser beam non-mechanically. In particular, Klein teaches the use of explicit optical phase shifters and a special dual function laser structure requiring separate laser drive current and phase shift control lines. The injection power to the array in Klein is reduced because of losses in the phase shifters. The phase shifters also induce photo refractive instabilities. The Klein apparatus is strictly open loop with no provision to compensate for de-phasing caused by thermal or mechanical distortion effects.

SUMMARY OF THE INVENTION

The optical wavefront synthesis apparatus includes a master laser and a slave laser array. Optical elements such as a diffraction grating and lens split light from the master laser into a plurality of beams and image each of the beams onto one of the lasers in the slave laser array which injection locks each of the slave lasers to the master laser frequency. A wavefront measurement sensor responsive to the spatial variation of the phase and intensity of light from the slave laser array is provided. The output from the wavefront measurement sensor is processed by a computer which controls the injection current applied to each of the slave lasers. In this way, the relative phase of each slave laser is controlled. In one embodiment, both the diffraction grating and the slave laser array are one-dimensional. In another embodiment, both the diffraction grating and slave laser array are two-dimensional.

The present invention controls the phase of the individual elements of the slave laser array employing the phenomenon of slave laser phase variation with injection current under injection locked operation. Thus, the need for explicit phase shifters is eliminated thereby increasing the available injection power to permit a wider frequency lock in range for the slave laser array. The wider lock in frequency range eases the requirements for uniformity of tuning characteristics among the elements of the slave laser array. The slave laser array as disclosed herein may include non-uniformly spaced arrays so as to effect better control of the synthesized optical wavefront.

In addition to simple single beam formation and steering, this invention permits synthesis of multiple spot beams and contoured single beams, and steering of all of these. Because this invention eliminates the need for electro-mechanical devices, much more rapid beam steering and adjustment of the optical wavefront is feasible. The inclusion of the optical wavefront measurement sensor as an integral part of the system enables highly accurate wavefront synthesis, and in addition, the feedback control using wavefront measurements compensates for de-phasing caused by thermal or mechanical distortion effects.

DESCRIPTION OF THE PREFERRED EMBODIMENT

Figure 1:
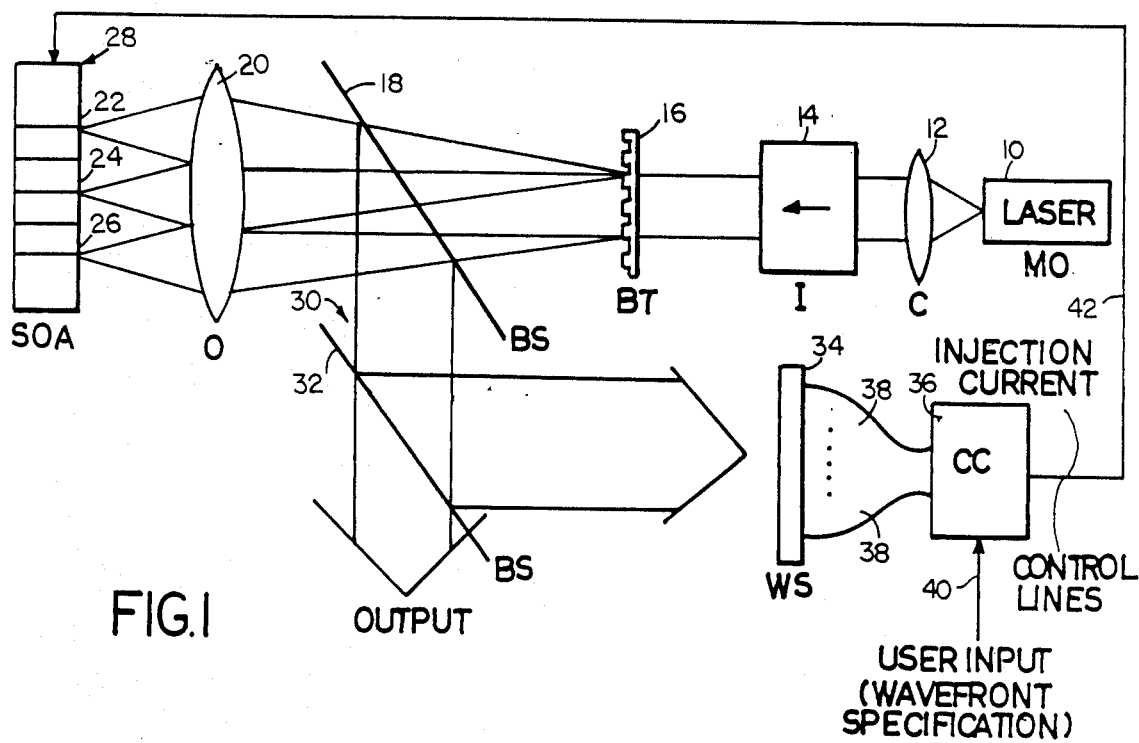
FIG. 1 is a schematic view of the one-dimensional embodiment of the present invention.

In FIG. 1 light from a master laser 10 is caused by a lens 12 and passes through an optical isolator 14 and falls on a diffraction grating 16. The diffraction grating 16 may be a binary phase grating as shown in the figure. The grating 16 splits light from the laser 10 into plural beams which pass through a beam splitter or optical circulator 18 and are imaged by a lens 20 onto individual lasers 22, 24, and 26 in a laser array 28. It is preferred that the element 18 be an optical circulator which, unlike a beam splitter, is a non-reciprocal device. The use of an optical circulator will improve the isolation between the high power array beam and the master laser, thereby reducing the potential for feedback instabilities. Moreover, the use of an optical circulator would ease the isolation requirements of the optical isolator 14, or might eliminate the need for the optical isolator altogether. The number of lasers in the array 28 shown in FIG. 1 is entirely exemplary. The light from the laser 10 imaged on the lasers 22, 24, and 26 injection locks them to the frequency of the master laser 10.

The output light from the lasers 22, 24, and 26 is imaged by the lens 20 and is reflected by the beam splitter or optical circulator 18 to form an output beam 30. A second beam splitter 32 reflects a portion of the output beam 30 toward a wavefront measurement sensor 34. The wavefront measurement sensor 34 measures spatial variations in phase and intensity across the wavefront. A suitable wavefront measurement sensor 34 is described by R. H. Rediker and T. A. Lind in "Integrated Optics Wavefront Measurement Sensor" S.P.I.E., Volume 551 ADAPTIVE OPTICS (1985), pp. 113-119. The outputs from the individual phase and intensity sensing elements of the wavefront measurement sensor 34 enter a control computer 36 on signal lines 38. The control computer 36 compares the wavefront as measured by the wavefront measurement sensor 34 with a user input 40 (desired wavefront) and generates injection current control signals along the control lines 42 which individually adjust the injection currents for the lasers 22, 24, and 26. It is known that the phase of a slave laser relative to that of the master injection laser varies with slave injection current when the slave laser is injection locked. See, "Optical Phase Modulation in an Injection Locked AlGaAs Semiconductor Laser" Kobayashi et al., IEEE Transactions on Microwave Theory and Techniques, Volume MTT-30, No. 10, October 1982, pp. 1650-1657.

Figure 2:
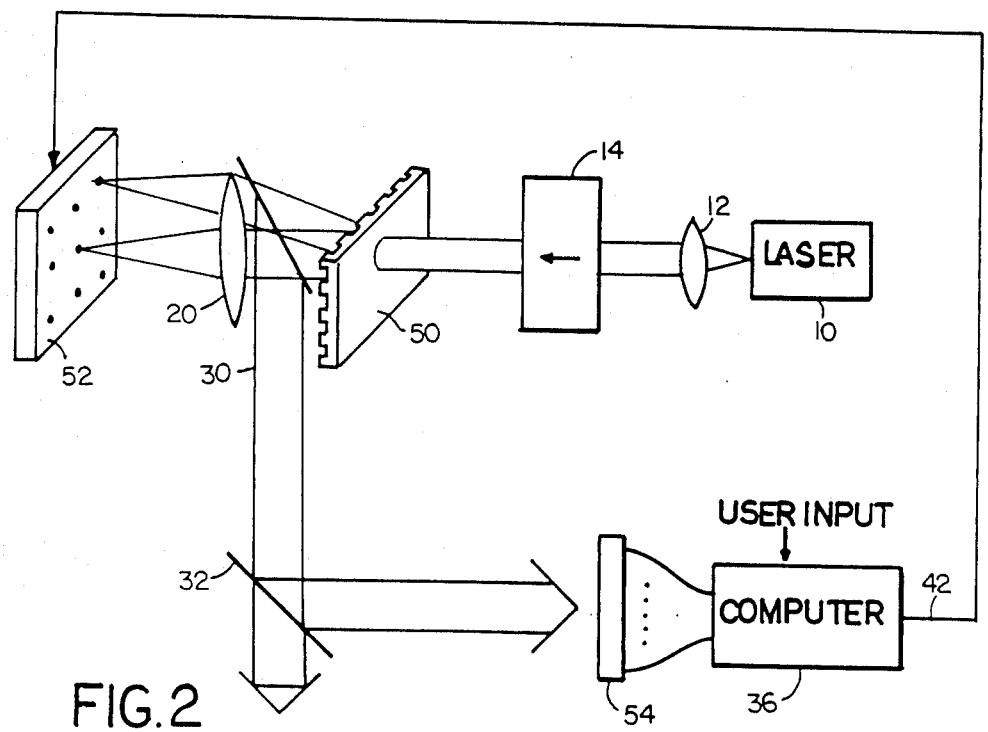
FIG. 2 is a two-dimensional embodiment of the present invention.

A two dimensional embodiment of the present invention is shown in FIG. 2. In this embodiment, a two-dimensional diffraction grating 50 such as binary phase grating is used in place of the one-dimensional diffraction grating 16 in FIG. 1. A two dimensional slave laser array 52 is illuminated by plural beams emanating from the two dimensional diffraction grating 50. A two dimensional optical wavefront measurement sensor 54 is responsive to spatial variations in phase and intensity over its two dimensional surface. As with the embodiment of FIG. 1, the computer 36 compares the output of the wavefront measurement sensor 54 with a desired input and controls the injection currents of each of the slave lasers in the two-dimensional array 52 to adjust the relative phases to synthesize the desired wavefront.

With the embodiments of FIGS. 1 and 2, a user selects a desired wavefront configuration and enters this information into the computer 36. The laser 10 injection locks each laser in the one-dimensional or two-dimensional slave laser array so that the lasers are locked to the frequency of the laser 10. The spatial phase and intensity structure of the wavefront is detected by the optical wavefront measurement sensor 34 or 54 and the measured wavefront is compared with the desired wavefront information stored in the computer 36. The computer 36 then adjusts the injection current of each of the lasers in the slave laser array individually to adjust their relative phases so as to drive the overall wavefront into conformity with the desired wavefront. The closed loop dynamic control of the phase of the individual lasers in the slave laser array compensates for dephasing caused by thermal or mechanical distortion effects.

What is claimed is:

1. Apparatus for optical wavefront synthesis comprising:
    a master laser;
    a slave laser array; capable of being injection locked; means for providing optical isolation;
    optical elements for splitting light from the master laser into a plurality of beams and to image each of the beams onto one of the slave lasers thereby injection locking the frequency of each of the slave lasers to the master laser frequency;
    a wavefront measurement sensor responsive to the spatial variation of the phase and intensity of the light from the slave laser array to generate an output signal; and
    a computer responsive to the output signal from the wavefront measurement sensor to control the injection current applied to each of the slave lasers, whereby the relative phase of each slave laser is controlled to effect the wavefront synthesis.

2. The apparatus of claim 1 wherein the optical elements include a diffraction grating and a lens.

3. The apparatus of claim 2 wherein the diffraction grating is one dimensional and the slave laser array is one dimensional.

4. The apparatus of claim 2 wherein the diffraction grating is two dimensional and the slave laser array is two dimensional.

5. The apparatus of claim 2 including a beam splitter disposed between the diffraction grating and the lens.

6. The apparatus of claim 2 including an optical circulator disposed between the diffraction grating and the lens.

7. The apparatus of claim 1 further including a lens and an optical isolator disposed between the master laser and the optical elements.

* * * * *

UNITED STATES PATENT AND TRADEMARK OFFICE
CERTIFICATE OF CORRECTION

PATENT NO. : 4,862,467

DATED : August 29, 1989

INVENTOR(S) : Michael J. Carter and David Welford

Page 1 of 2

It is certified that error appears in the above-identified patent and that said Letters Patent is hereby corrected as shown below: On the title page:

At item [56] "References Cited", under "U.S. Patent Documents", add
--3,331,651  7/1967  Sterzer
  3,518,419  12/1967  Humphrey
  3,942,150  3/1976  Booth et al.
  4,217,587  8/1980  Jacomini
  4,488,155  12/1984  Wu
  4,578,791  3/1986  Chen--;

At item [56] "References Cited", under "U.S. Patent Documents", change "Velpkamp et al." to --Veldkamp et al.--;

At item [56] "References Cited", add
--Other Publications
Rediker et al., Adaptive Optics, SPIE Vol. 551, 1985, pp. 113-119.
Kobayashi et al., IEEE Trans. on Microwave Theory and Techniques, vol, MTT-30, No. 10, October 1982, pp. 1650-1657.
Hardy, Proc. of IEEE, Vol. 66, No. 6, June 1978, pp. 651-697.
Koepf, Optical Technology for Microwave Applications SPIE vol. 447, pp. 75-81, 1984.
Stilwell et al., IEEE, 1986, pp. 345-348.
Walpole et al., Appl. Phys. Lett., vol. 48, No. 25, June 16, 1986, pp. 1636-1638.
Kunath, IEEE, 1986, pp. 353-4.
Carlin, RCA Engineer, 31-3, May/June 1986, pp. 20-25.
Herczfeld et al., IEEE, 1986, pp. 349-352.
Bedrosian, Proc. of IEEE, vol. 74, No. 7, July 1986, pp. 1040-1043.
Leger et al., Appl. Phys. Lett., vol. 48, No. 14, April 7, 1988, pp. 88-890.
Swanson et al., FAST ELECTRONIC BEAM STEERING OF THE OUTPUT BEAMS OF LASER DIODE ARRAYS.--

UNITED STATES PATENT AND TRADEMARK OFFICE
CERTIFICATE OF CORRECTION

PATENT NO. : 4,862,467
DATED : August 29, 1989
INVENTOR(S) : Michael J. Carter and David Welford It is certified that error appears in the above-identified patent and that said Letters Patent is hereby corrected as shown below:

```
Column 1, line 35, change "photo" to --photo- --;
         line 64, change "lock in" to --lock-in--;
         line 65, change "lock in" to --lock-in--.
Column 2, line 24, change "caused" to --focused--.
Column 3, line 7, change "two dimensional" to
--two-dimensional--;
         line 9, change "two dimensional" to
--two-dimensional--;
         line 9, change "two di-" to --two-di- --;
         line 12, "two dimensional" to
--two-dimensional--.
Column 4, line 4, after "array", delete ";".
```

Signed and Sealed this

Third Day of July, 1990

Attest:

HARRY F. MANBECK, JR.

Attesting Officer

Commissioner of Patents and Trademarks